United States Patent [19]

Pennington

[11] 4,065,114
[45] Dec. 27, 1977

[54] GUIDE FOR A MOTORIZED CIRCULAR HANDSAW

[76] Inventor: Charles A. Pennington, 2910 E. Virginia, No. 17, West Covina, Calif. 91790

[21] Appl. No.: 747,368

[22] Filed: Dec. 3, 1976

[51] Int. Cl.² .............................................. B25B 3/00
[52] U.S. Cl. .......................................... 269/2; 83/745
[58] Field of Search ................................ 83/743–745; 408/103, 108–109, 115 R; 269/1, 2

[56] References Cited
U.S. PATENT DOCUMENTS

| | | | |
|---|---|---|---|
| 2,942,633 | 6/1960 | King | 83/745 |
| 2,976,899 | 3/1961 | Lane | 269/2 |
| 3,829,231 | 8/1974 | Hamilton | 269/2 |
| 3,939,915 | 2/1976 | Wood | 269/2 |

*Primary Examiner*—Robert C. Watson
*Attorney, Agent, or Firm*—Boniard I. Brown

[57] ABSTRACT

A guide for a motorized handsaw which guide includes a track member and clamps which fixedly engage the track and clamp to the underside adjacent edges of the workpiece to be cut by the saw. The clamps include sawable workpiece edge engaging members which extend into the area of the expected saw cut so that they indicate the guided saw line therebetween.

9 Claims, 7 Drawing Figures

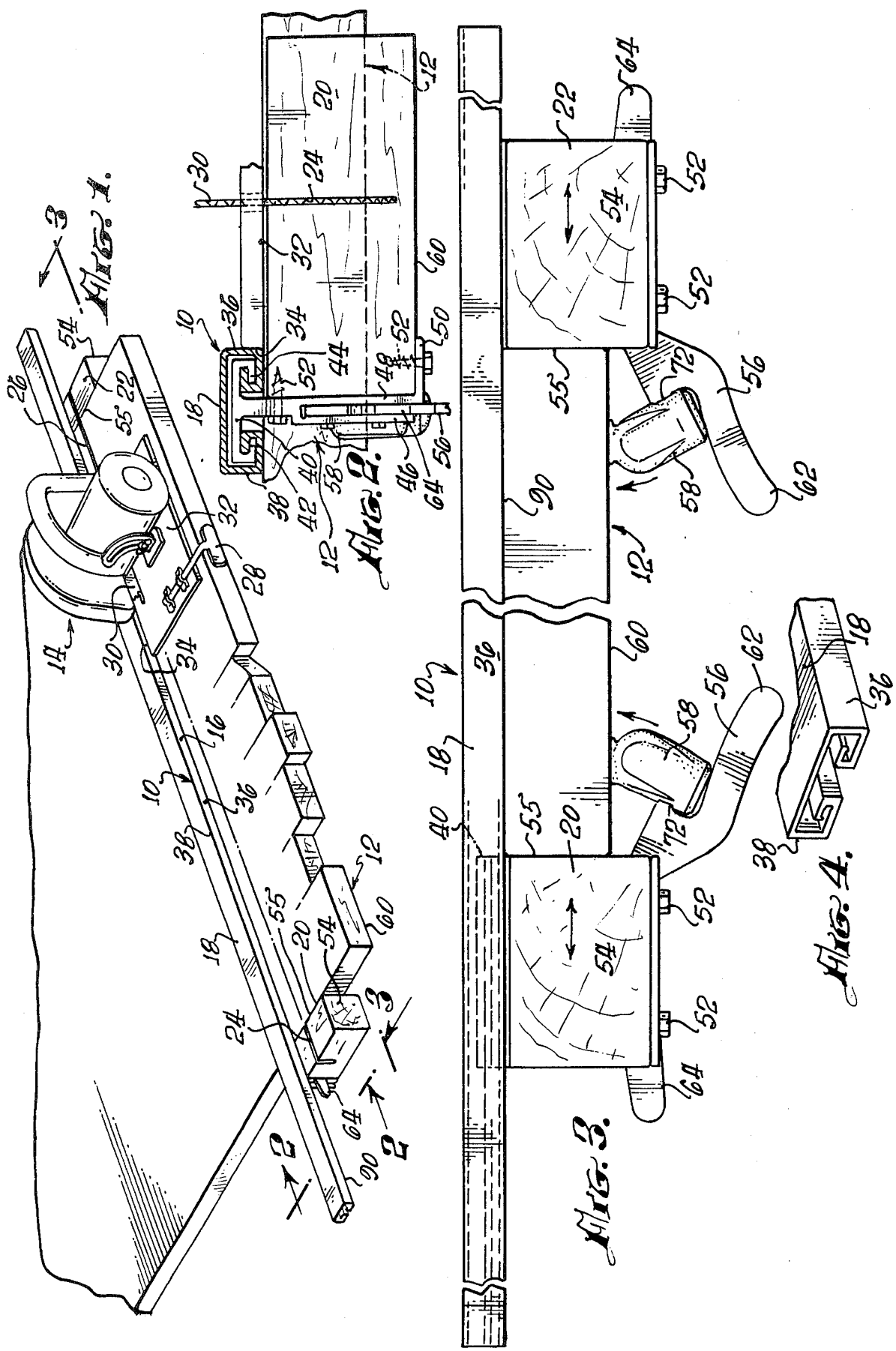

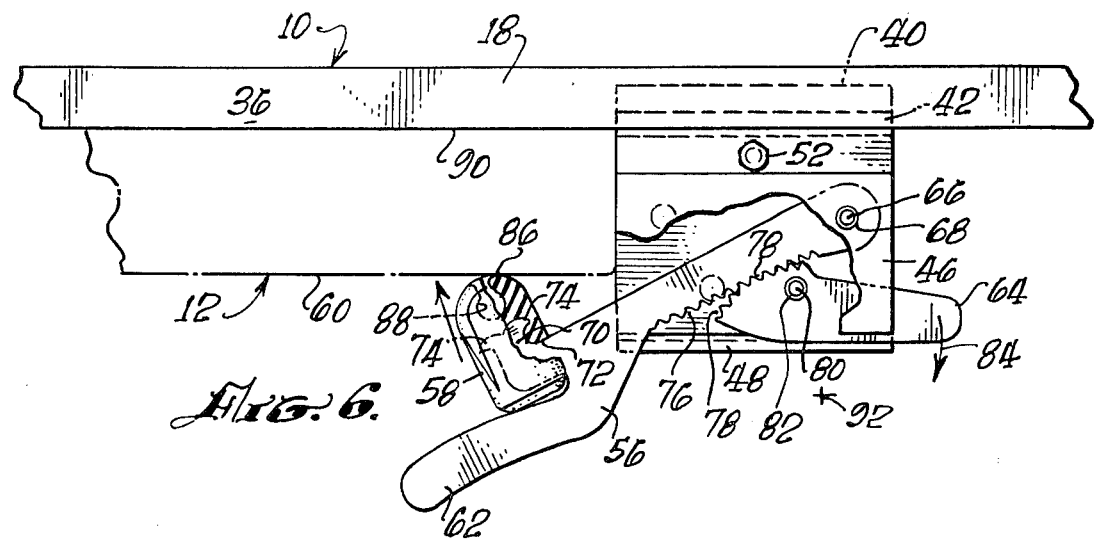
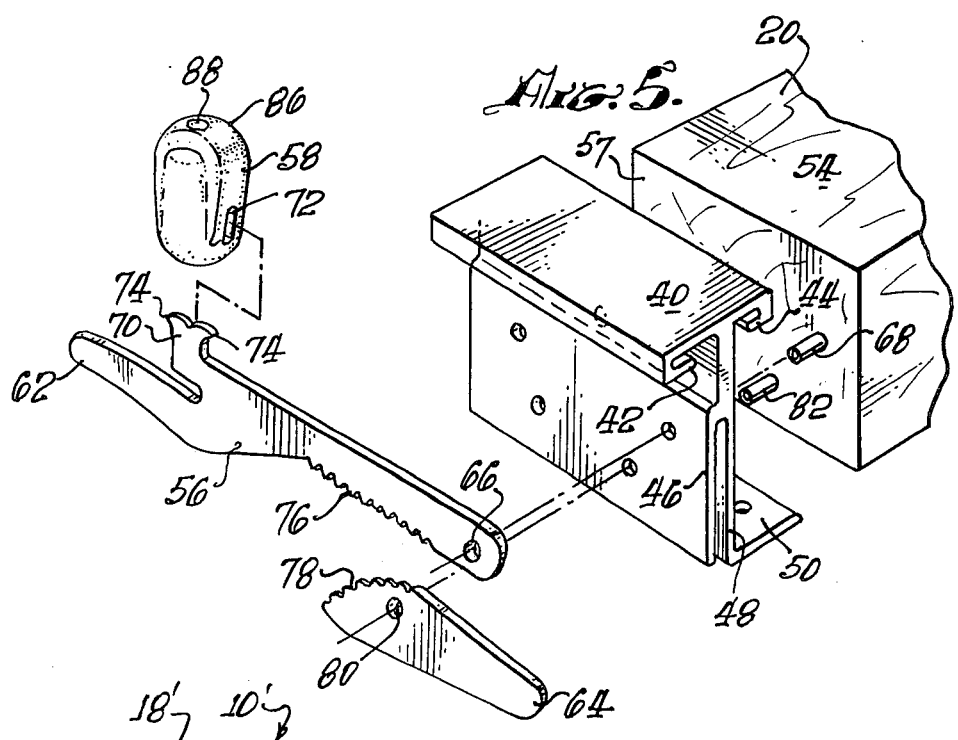
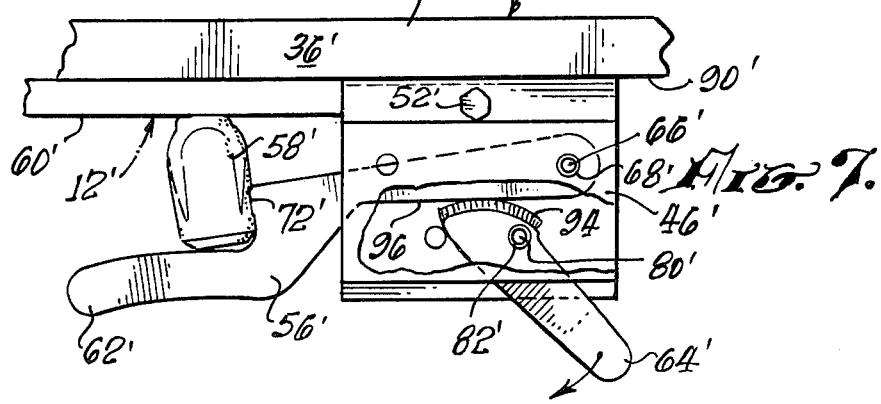

GUIDE FOR A MOTORIZED CIRCULAR HANDSAW

BACKGROUND OF THE INVENTION

Motorized circular handsaws and saber saws have become indispensable tools in the wood construction trade. The circular handsaws are commonly used to make straight cuts in material inconvenient to cut on a fixed saw or too large to be transported conveniently to one. Such operations commonly include the cutting of straight edges on panelling and doors where any variation from the desired line is visible and indicative of shoddy workmanship. Such motorized saws commonly have a guide integral therewith which takes the form of a slipper which rides along an edge of the workpiece parallel to the desired saw line. Such slipper type guides depend upon a straight guiding surface which very often does not exist. Also because the slipper is usually a substantial distance from the saw blade, it requires great care in use or the saw becomes cocked and a ragged saw line results. Of course the other expedient is to draw a line on the workpiece, indicating the desired saw line and then through careful manipulation of the handsaw insure that the saw blade cuts along the line. This is usually less accurate than is desirable partially because most circular handsaws have a base slide plate which obscures the workman's view for an inch (3 centimeters) or so ahead of the spinning saw blade. Therefore, improved means to assure straight cuts with circular handsaws have been desired but heretofore not available in convenient and economical form.

BRIEF SUMMARY OF THE PRESENT INVENTION

The present invention solves the aforementioned problems by providing an easy to use guide for a motorized circular handsaw which can be used even in cases where no surface parallel to the desired saw line exists. The present invention includes a guide bar having at least one sidewardly facing slide abutment surface thereon against which the side surface of the circular saw slide plate can be aligned, the side surface of such saws normally being parallel to the saw blade therein. The guide member is retained in proper position in contact with the surface of the workpiece by means of clamping members. The clamping members have upstanding T portions which slidingly engage an involuted channel in the underside of the guide bar.

The clamps each include a workpiece engaging lever having a frictional finger thereon which extends to and frictionally engages the underside of the workpiece. A jam mechanism is provided to assure forceable contact of the finger with the workpiece. The clamp also includes a sidewardly extending sawable portion which normally engages the side of the workpiece to assure that the guide is at right angles thereto. When the invention is first used with a new saw, the sawable portions are sawn along with the workpiece and later the sawlines in the sawable portions indicate the opposite ends of the workpiece sawline allowing alignment of the guide bar as it is being clamped to the workpiece. Since the clamps are slidable with respect to the guide bar they can be used for any length cut that does not extend further than the length of the guide bar.

It is therefore a principle object of the present invention to provide improved means for guiding a motorized circular handsaw when it is desired to cut a straight line.

Another object is to provide a circular saw guide which can be used with workpieces of various widths.

Another object of the present invention is to provide a guide which clamps to a workpiece without fear of marring or damaging the workpiece.

Another object of the present invention is to improve the quality of wood construction without requiring additional skills of the workmen.

Another object is to provide a circular saw guide which is simple to use and relatively economical to manufacture.

Another object is to provide a circular handsaw guide which can be used with various brands and sizes of saws.

Another object is to provide a guide which is mechanically rugged and simple so that it has a long and trouble-free lifetime.

Another object is to provide a guide which can be used with a range of workpiece depths which at least equal the depth capacity of the circular handsaw.

These and other objects and advantages of the present invention will become apparent to those skilled in the art after considering the following detailed specification which discloses the preferred embodiments thereof in conjunction with the accompanying drawings:

BRIEF DESCRIPTION OF THE DRAWINGS

FIG. 1 is a perspective view of the present invention engaged with the workpiece and guiding a typical motorized circular handsaw;

FIG 2 is a partial end view of the present invention taken on line 2—2 of FIG. 1;

FIG. 3 is a fragmented, enlarged side view of the present invention taken on line 3—3 of FIG. 1;

FIG. 4 is a perspective view to detail the cross-section of the guide bar of the present invention;

FIG. 5 is an exploded view of the clamping mechanism of the present invention;

FIG. 6 is a side elevational view partially in cross-section showing one clamp engaged with a relatively thick workpiece; and FIG. 7 is a similar view of a clamp with modified jam means engaged with a relatively thin workpiece.

DETAILED DESCRIPTION OF THE SHOWN EMBODIMENTS

Referring to the drawings more particularly by reference numbers, number 10 in FIG. 1 refers to a saw guide constructed according to the present invention, clamped onto a workpiece 12 to guide a motorized handsaw 14 along a saw line 16. The guide 10 includes a guide bar 18 which extends parallel to the desired saw line 16 and a pair of clamps 20 and 22 positioned about the workpiece 12 on opposite ends of the desired saw line 16. The clamps 20 and 22 are used to retain the guide bar 18 in the desired position on the workpiece 12 and usually include cuts 24 and 26 partially therethrough which can be used to indicate the guided saw line 16.

The saw 14 as shown, includes a slipper guide 28 whose unacceptable nature the present invention solves. It should be noted that the saw 14 also includes a circular saw blade 30 and a saw slide plate 32 which has a guide edge 34 thereon which is in parallel alignment with the blade 30 so that as the slide plate 32 moves across the workpiece 12, the edge 34 remains parallel to the line sawn by the saw blade 30.

As shown in FIG. 2, the edge 34 is placed in engagement with one of the opposite side edges 36 or 38 of the guide bar 18 so that when the guide bar 18 is retained in a fixed position with respect to the workpiece 12, a straight cut at the desired position is assured.

The guide bar 18 is retained in the proper position with respect to the workpiece 12 by means of the clamps 20 and 22 with clamp 20 being shown in FIG. 2. The guide bar 18 is shown as being an involuted channel member shaped to slidably retain an upstanding T section portion 40 of a clamp extrusion 41. It is preferable that the T section 40 have a shape such as that formed by the turned downwardly and inwardly arms 42 and 44 thereof so that an interlocking arrangement is established with the guide bar 18.

The clamp members also include a bifurcated lower portion 46 whose inner arm 48 includes a sidewardly extending flange 50 which in association with the side of the arm 48 and fastener means such as the screws 52 engage and retain sawable clamp blocks 54. The blocks 54 normally include an abutment edge 55 (FIG. 1) which is restrained perpendicular to the guide edges 36 and 38 and normally engages sides of the workpiece 12. The clamps 20 and 22 each include a lever 56 which restrains frictional means such as the fingers 58 shown in FIG. 3. The fingers 58 are forceably engaged with the undersurface 60 of the workpiece by upward force on an extending lever arm portion 62 thereof. Levers 56 are then locked in the engagement position by movement of lock levers 64 which are more clearly shown in FIG. 5.

In FIG. 5 it can be seen that the lever 56 includes in addition to the lever 62, a pivot 66 which allows pivoting attachment to the bifurcated portion 46 of the clamp extrusion 41 by means of a pin 68. The pivoted joint formed by the pin 68 allows the lever 56 to rotate with respect to the extrusion 41. The lever 56 further includes a tang 70 or other suitable engagement feature for engaging and retaining the finger 58 thereon. As shown the tang 70 fits through a slot 72 in the finger 58 and within the interior thereof with the tang points 74 assuring locking engagement therebetween. The lever 56, as aforesaid, includes means such as the serrations 76 therealong for engagement by similar serrations 78 on the lock lever 64. The positioning of the serrations 78 on the lever 64 is circular with respect to its pivot 80, it being connected for rotation to the extrusion 41 by pin 82. This assures that forces established through deformation of the finger 58 cause the lever 64 to attempt to move in the direction shown by arrow 84 in FIG. 6 which further jams the connection therebetween to maintain the forceable contact between the finger 58 and the underside 60 of the workpiece.

The fingers 58 are made with a frictional surface portion 86 and a hollowed out portion 88 therebehind to improve the resilient characteristics of the finger 58 and assure frictional contact is maintained. The upward force generated by the finger 58 is opposed by the undersurface 90 of the guide member 18 and also prevents sliding of the guide member 18 with respect to the clamps 20 and 22 by generating an off-center force which tends to jam the T portion 40 of the clamps in the channel.

FIG. 6 shows the finger 58 engaged with a relatively thick panel. To release the panel once the cut has been made, manual force is applied to the arm 62 to further deform the finger 58 until the serrations 76 and 78 become disengaged at which point it is possible to move the lever 64 in a direction opposite to the arrow 84. Once this has occurred, the lever 56 can move downwardly so that the finger 58 disengages from the workpiece. The serrations 76 and 78 are specially shaped to maintain the proper forces about the pivots 66 and 80 and are shown as a relatively straight serration 76 and a circular serration 78 whose projected center 92 is offset from the pivots 80 and 66.

In FIG. 7, slightly modified lever arm 56' and jam arm 64' show how a thinner panel can also be engaged by the invention 10'. In FIG. 7 a frictional blanket such as a rubber slipper 94 has been employed on the lock lever 64' having a shape similar to that of the serrations 78 whereas a smooth friction surface 96 has been provided on the lever 56'. This is to show that many suitable friction means can be employed.

Thus there has been shown and described novel guide means for a motorized circular handsaw which fulfill all of the objects and advantages sought therefor. Many changes, modifications, variations and other uses and applications which do not depart from the spirit and scope of the invention are deemed to be covered by the invention which is limited only by the claims which follow.

What is claimed is:

1. Guide means for guiding a saw along a workpiece, the saw having a slide plate with an edge surface thereon which is parallel to the saw line of the saw, said guide means including:
   a guide member having a workpiece engaging surface and at least one guiding abutment surface against which the edge surface of the saw slide plate can slide and be guided, said guide member being shaped to define a longitudinal channel therewithin,
   a pair of clamp members for retaining said guide member in the desired guiding position on the workpiece, said members each having an end portion adapted to slidingly engage said guide member channel and to be retained thereby, a resilient member adapted to frictionally and forcibly engage the workpiece on the opposite side thereof from said guide member workpiece engaging surface, and means forming a connection between said end portion and said resilient member of said clamp member, said means forming a connection between said end portion and said resilient member including a body portion, said end portion forming one end thereof, a lever arm including means to retain said resilient member thereon, pivot means connecting said body portion and said lever arm, and means to retain said lever arm in desired positions with respect to any body portion, said means to retain said lever arm in desired positions with respect to said body portion including a lock lever having first frictional means thereon,
   lock lever pivot means which pivotally restrain said lock lever to said body portion, and
   second frictional means on said lever arm in position to be selectively engaged with said first frictional means to enable said lock lever to jam said lever arm in position with its resilient member engaged with the workpiece.

2. The guide means defined in claim 1 wherein said first and second frictional means are mating serrations on said respective lock lever and lever arm.

3. The guide means defined in claim 2 wherein said lever arm includes an upstanding tang, said resilient member defining a slot through which said tang engages said resilient member.

4. The guide means defined in claim 3 wherein said resilient member includes:
- a frictional surface positioned to engage the workpiece; and
- a cavity therebehind to assure the member has the desired resilient characteristics.

5. The guide means defined in claim 4 wherein said lever arm includes a handle for manual application of force, said handle being located further from said lever arm pivot means than said resilient member so that force applied to said resilient member by said handle is amplified.

6. The guide means defined in claim 5 wherein said clamp member end portion has a T cross-section whose arms are involuted, said channel of said guide member having a cross-sectional shape which mates with said T cross-section.

7. The guide means defined in claim 1 wherein said first frictional means are circular and said second frictional means are linear.

8. The guide means defined in claim 1 wherein said clamp members each include a sawable block connected thereto, said sawable block having an edge surface at a right angle to said guide member guiding abutment surface for engaging the side of the workpiece.

9. The guide means defined in claim 8 wherein said sawable block also includes a slot which is aligned with the blade of the saw when the saw is guided whereby said slots in said blocks indicate the guided saw line.

* * * * *